United States Patent
Maiorano et al.

(10) Patent No.: US 12,517,831 B1
(45) Date of Patent: Jan. 6, 2026

(54) EFFICIENT NON-STALLING CACHELINE TRIGGERED PREFETCH PIPELINE OPTIMIZATION FOR INDIRECT MEMORY ACCESSES

(71) Applicant: QUALCOMM Incorporated, San Diego, CA (US)

(72) Inventors: Damian Maiorano, San Jose, CA (US); Sabine Francis, Austin, TX (US); Tanvir Manhotra, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/828,886

(22) Filed: Sep. 9, 2024

(51) Int. Cl.
*G06F 12/08* (2016.01)
*G06F 12/0862* (2016.01)

(52) U.S. Cl.
CPC ................ *G06F 12/0862* (2013.01)

(58) Field of Classification Search
CPC .................................... G06F 12/0862
See application file for complete search history.

(56) References Cited

U.S. PATENT DOCUMENTS

| 2003/0154349 A1* | 8/2003 | Berg | G06F 9/30181 |
| | | | 712/E9.047 |
| 2024/0184581 A1* | 6/2024 | Alexander | G06F 12/0862 |
| 2025/0245161 A1* | 7/2025 | Xia | G06F 12/0811 |

FOREIGN PATENT DOCUMENTS

CN   118276946 A   *  7/2024  ......... G06F 9/30145

OTHER PUBLICATIONS

CN118276946A, Machine Translation from Google Patents (Year: 2024).*

* cited by examiner

*Primary Examiner* — Khoa D Doan
*Assistant Examiner* — Kaitlyn H Pham
(74) *Attorney, Agent, or Firm* — Patterson+ Sheridan LLP (57) ABSTRACT

Certain aspects provide a method of efficiently computing a starting address and offset for a memory prefetch address. The method generally includes computing a distance parameter that represents a difference between a line trigger virtual address and a producer virtual address, generating a starting address for a memory prefetch as a function of the distance parameter and a stride size, wherein the staring address is generated using a logically shifted version of the distance parameter if a first condition is met, and performing the memory prefetch using the generated starting address.

20 Claims, 7 Drawing Sheets

EFFICIENT NON-STALLING CACHELINE TRIGGERED PREFETCH PIPELINE OPTIMIZATION FOR INDIRECT MEMORY ACCESSES

TECHNICAL FIELD

Certain aspects of the present disclosure generally relate to prefetchers and, more particularly, to efficient implementations for indirect memory prefetcher (IMP) components.

BACKGROUND

A processing system includes a central processing unit (CPU), cache memory, main memory (e.g., random access memory), and a prefetcher. The prefetcher anticipates data (and/or instructions) the CPU may need from the main memory, fetches the data from the main memory, and loads the data into the cache memory. By fetching the data from the main memory before the data is needed by the CPU, the prefetcher minimizes an amount of time the CPU has to wait for data thereby improving the efficiency of the processing system.

BRIEF SUMMARY

Certain aspects provide a method of efficiently computing a starting address and offset for a memory prefetch address. The method generally includes computing a distance parameter that represents a difference between a line trigger virtual address and a producer virtual address, generating a starting address for a memory prefetch as a function of the distance parameter and a stride size, wherein the staring address is generated using a logically shifted version of the distance parameter if a first condition is met, and performing the memory prefetch using the generated starting address.

Other aspects provide a processor comprising a prefetcher configured to perform the aforementioned method as well as those described herein; and a processor comprising means for performing the aforementioned method as well as those further described herein.

The following description and the related drawings set forth in detail certain illustrative features of one or more aspects.

BRIEF DESCRIPTION OF THE DRAWINGS

The appended figures depict certain features of one or more aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Aspects of the present disclosure provide apparatuses, methods, processing systems, and computer-readable mediums for training an IMP address generation component.

Memory prefetching generally refers to a mechanism used in computer architectures to improve the efficiency of memory access by speculatively loading data into memory with low access times (e.g., a local cache). Prefetching works by predicting which data (or instructions) will be needed soon (e.g., next or in the near future) and loading that data into a cache (which is fast access) before it is actually requested by a processor (e.g., a central processing unit/CPU). This helps to reduce the latency associated with fetching data from main memory, which is slower than accessing data from the cache. By preloading data into the cache, prefetching can significantly speed up the execution of programs, especially those with predictable memory access patterns, such as loops or sequential data processing.

There are various types of prefetching techniques, including hardware prefetching and software prefetching. As the name implies, hardware prefetching is implemented in hardware and operates automatically, without requiring any software intervention. Hardware prefetching relies on algorithms to predict future memory accesses based on past patterns.

An indirect memory prefetcher (IMP) generally refers to a type of hardware prefetcher designed to work with relatively complex tasks with less predictable access patterns. These patterns might occur in data structures like linked lists, trees, or hash tables, where the next memory address is determined by the content of the current memory location (e.g., following a pointer). An indirect prefetcher analyzes the memory access patterns and the data dependencies to predict which addresses will be accessed next, even if the sequence is not linear or regular.

An IMP typically scans memory access data for potential pointers, and issues prefetches for these pointers. Such prefetching engines often suffer from inaccuracies and latency. Accuracy and timeliness are two metrics used for measuring the effectiveness of prefetching, as both can impact performance and power consumption.

As will be discussed in more detail with reference to FIGS. 2 and 3, to improve timeliness, prefetching may be triggered by demand misses and by prefetches generated by other types of prefetchers (such as stride or Delta prefetchers). As an example, a triggering event may be based on a last level cache (e.g., 64B) chunk fill data (hereinafter referred as cacheline).

To improve accuracy, an IMP strives to compute the exact offset of the trigger virtual address with respect to the start of the cacheline, and issues prefetches starting from the computed offset. This computation is part of what may be referred to as a launch prefetch-request pipeline. To achieve prefetch timeliness, it is desirable to avoid stalls in this pipeline, in order to launch as many prefetches as possible.

Techniques proposed herein may be used to efficiently generate accurate prefetch address and offsets, as well as a prefetch vector structure. The techniques may help prevent the launch prefetch-request pipeline from stalling, while calculating a precise offset of the trigger virtual address relative to the beginning of the cacheline.

Example Computing Environment for Prefetching

Figure 1:
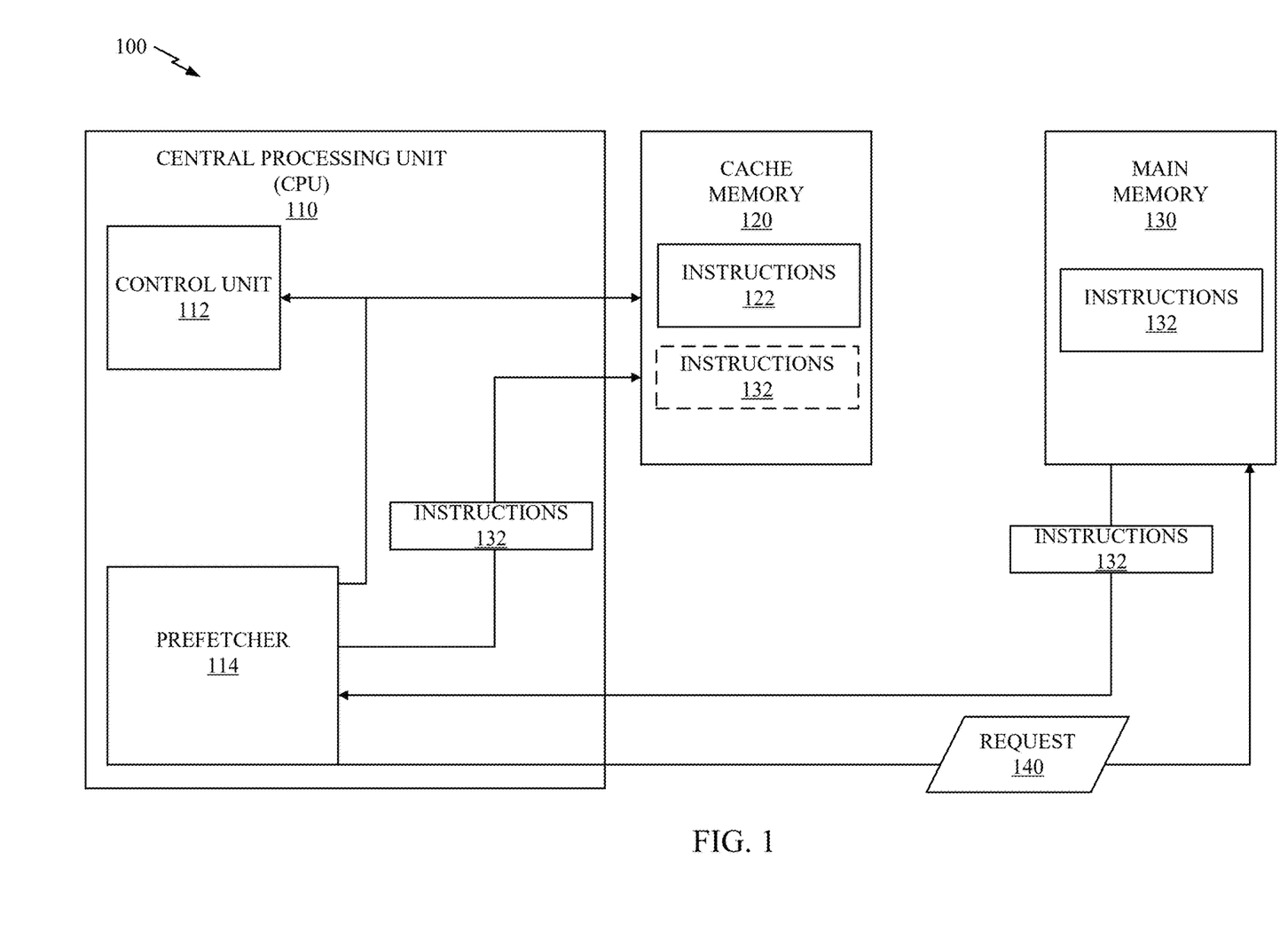
FIG. 1 depicts an example computing environment for prefetching an access pattern associated with an application according to various aspects of the present disclosure.

FIG. 1 illustrates an example computing environment 100 for prefetching according to various aspects of the present disclosure. The computing environment 100 includes a central processing unit (CPU) 110 configured to execute instructions to perform various computing operations. The CPU 110 may include a control unit 112 and a prefetcher 114.

The computing environment 100 includes a cache memory 120 communicatively coupled to the CPU 110. The cache memory 120 may store instructions 122 to be executed by the CPU 110. Although the cache memory 120 is depicted as being separate from the CPU 110, the cache memory 120 may, in some aspects, be included as part of the CPU 110.

The computing environment 100 includes a main memory 130. The main memory 130 is slower than the cache memory 120 and is configured to store instructions 132 to be executed by the CPU 110. In certain aspects, the main memory 130 may include random access memory (RAM).

The prefetcher 114 of the CPU 110 is configured to anticipate data and/or instructions, such as the instructions 132 stored in the main memory 130, that are needed by the CPU 110, such as the control unit 112 thereof, and are not already loaded into the cache memory 120. The prefetcher 114 may be further configured to fetch the instructions 132 from the main memory 130 and load the instructions 132 into the cache memory 120 before the instructions 132 are needed by the CPU 110.

As an example, a prefetch operation performed by the prefetcher 114 may include the prefetcher 114 requesting the instructions 132 from the main memory 130 (e.g., by sending a request 140). The prefetcher operation may include receiving the instructions 132 from the main memory 130 and loading the instructions 132 into the cache memory 120. By fetching the instructions 132 from the main memory 130 and loading the instructions 132 into the cache memory 120 before the instructions 132 are needed by the CPU 110, the prefetcher 114 minimizes an amount of time the CPU 110 has to wait for the instructions 132 thereby improving the performance (e.g., efficiency) of the CPU 110.

In certain aspects, the instructions 132 stored on the main memory 130 may include multiple instructions stored at different memory addresses of the main memory 130. For example, a first instruction for the control unit 112 may be stored at a first memory address of the main memory 130, and a second instruction for the control unit 112 may be stored at a second memory address of the main memory 130. In such aspects, the prefetcher 114 may be configured to perform separate prefetch operations for the first instruction and the second instruction.

As an example, a first prefetch operation performed by the prefetcher 114 may include sending a request to read the data (e.g., first instruction) stored at the first memory address to obtain the first instruction. In this manner, the prefetcher 114 may obtain the first instruction to load into the cache memory 120. Furthermore, a second prefetch operation performed by the prefetcher 114 may include sending a request to read the data (e.g., second instruction) stored at the second memory address to obtain the second instruction. In this manner, the prefetcher 114 may obtain the second instruction to load into the cache memory 120.

Example Indirect Memory Prefetcher

As noted above, an indirect memory prefetcher (IMP) generally refers to a type of hardware prefetcher designed to work with relatively complex tasks with less predictable access patterns. These patterns might occur in data structures like linked lists, trees, or hash tables, where the next memory address is determined by the content of the current memory location (e.g., following a pointer). An indirect prefetcher analyzes the memory access patterns and the data dependencies to predict which addresses will be accessed next, even if the sequence is not linear or regular.

An indirect memory prefetcher differs from a direct memory prefetcher in the way it predicts future memory accesses.

Direct prefetchers typically predict future memory addresses based on regular patterns or strides observed in the sequence of memory accesses. For example, if a program accesses memory addresses in a linear sequence (e.g., 1000, 1004, 1008), a direct prefetcher might analyze this sequence to deduce the stride size is 4. Based on this information, the direct prefetcher may predict that the next address will be 1012 and prefetch that data.

Indirect prefetchers, on the other hand, are typically designed to handle more complex and less predictable access patterns. These patterns might occur in data structures like linked lists, trees, or hash tables, where the next memory address is determined by the content of the current memory location (e.g., following a pointer). An indirect prefetcher analyzes the memory access patterns and the data dependencies to predict which addresses will be accessed next, even if the sequence is not linear or regular.

In this manner, indirect prefetchers identify complex access patterns that are dependent on the data rather than the sequence of accesses. Indirect prefetchers may use machine learning or heuristic-based techniques to adapt to the access patterns of the running program. Indirect prefetchers may be particularly useful for pointer-chasing workloads, where each memory access depends on the result of the previous one, such as in linked data structures.

By prefetching data more accurately for irregular access patterns, indirect prefetchers can significantly reduce cache misses and memory latency. By helping to keep the cache populated with useful data, indirect prefetchers may help improve overall cache utilization and efficiency.

Figure 2:
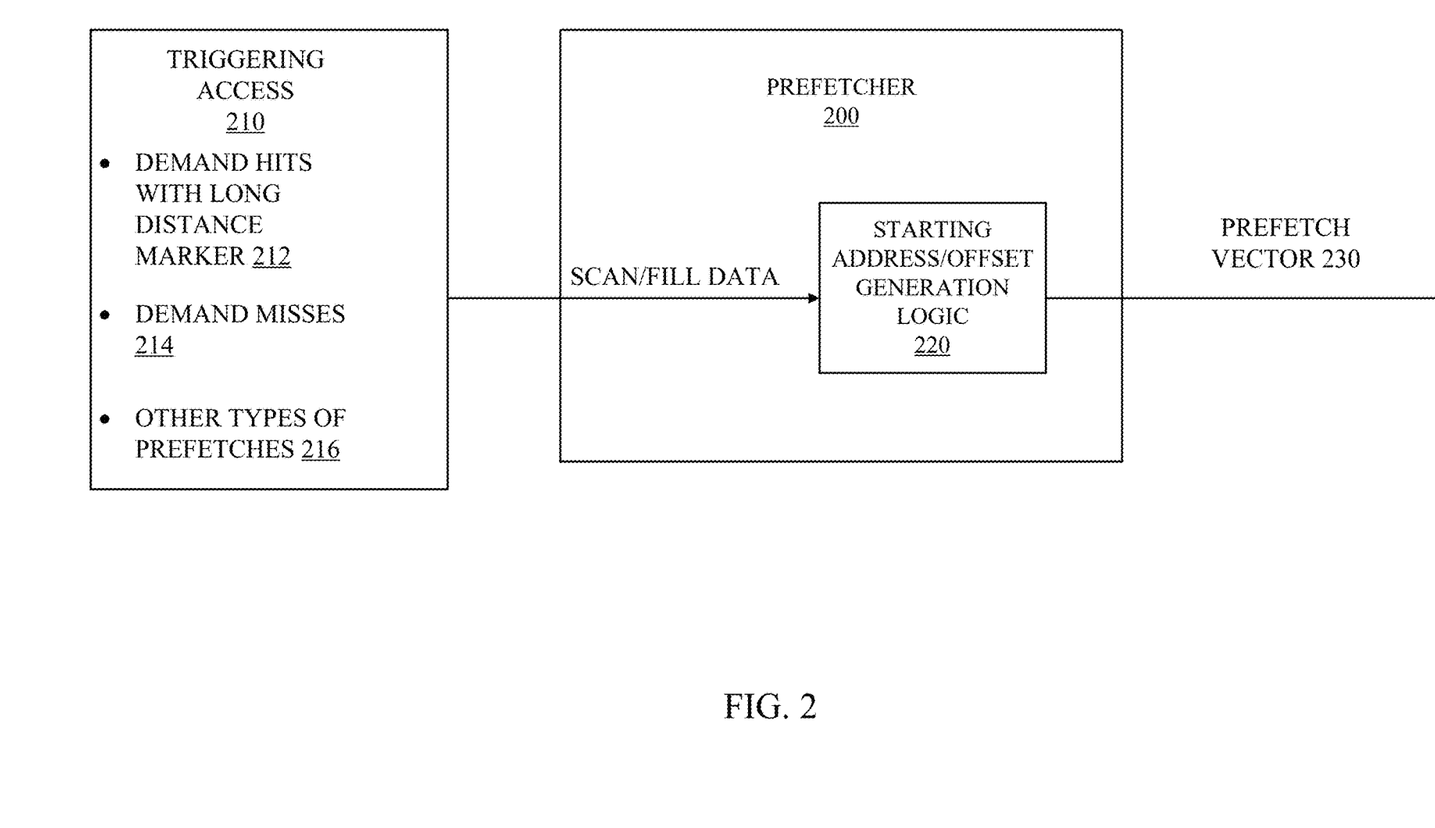
FIG. 2 depicts an address generation component of an indirect memory prefetcher (IMP), according to various aspects of the present disclosure.

FIG. 2 depict a prefetcher 200 receiving a triggering access 210 that prompts the prefetcher 200 to perform a prefetch, in accordance with aspects of the present disclosure. More specifically, the triggering access 210 may cause the prefetcher 200 to scan/fill data associated with the triggering access 210 and may further cause the prefetcher 200 to implement start address/offset generation logic 220 (e.g., discussed in more detail with reference to FIG. 3) on the data to identify information that is needed to generate a prefetch vector 230 used to perform a prefetch. The prefetcher 200 may be implemented in the computing environment 100 discussed above with reference to FIG. 1. More specifically, the prefetcher 200 may be the prefetcher 114 in FIG. 1 or, alternatively, the prefetcher 200 may be included in the computing environment 100 in addition to the prefetcher 114.

In some aspects, the triggering access 210 may be associated with a demand hit 212 (e.g., also known as a cache hit) in cache memory (e.g., the cache memory 120 illustrated in FIG. 1). More specifically, the demand hit 212 may be an instance in which data requested by the CPU (e.g., the CPU 110 illustrated in FIG. 1) is already stored in the cache memory and therefore does not need to be fetched from other memory, such as the main memory 130 illustrated in FIG. 1. In other aspects, the triggering access 210 may be associated with a demand miss 214 (e.g., also known as a cache miss) in cache memory which, in contrast to the demand hit, may be an instance in which the data requested by the CPU is not already stored in the cache memory. In still other aspects, the triggering access may be associated with a prefetch 216 performed by another prefetcher, such as a stride prefetcher.

Efficient Non-Stalling Cacheline Triggered Prefetch Pipeline Optimization

As noted above, to improve accuracy, an IMP may strive to compute the exact offset of the trigger virtual address with respect to the start of the cacheline, and issues prefetches starting from the computed offset. This computation is part of what may be referred to as a launch prefetch-request pipeline.

Techniques proposed herein may be used to efficiently generate accurate prefetch address and offsets, as well as a prefetch vector structure. The techniques may help prevent the launch prefetch-request pipeline from stalling, while calculating a precise offset of the trigger virtual address relative to the beginning of the cacheline.

In some cases, an IMP may utilize a vector structure to help efficiently prefetch data. For example, FIG. 3 illustrates an example prefetch vector 300. As illustrated, the vector may have a series of 1s in locations that are to be fetched, beginning with a start address (e.g., an offset of a trigger virtual address with respect to the start of the cacheline). As illustrated, the spacing between 1s corresponds to the stride size.

Vector 300 may be useful because a prefetcher, such as a stride prefetcher, may have cache line granularity. Cache line granularity generally means that data fetched by the prefetcher does not include sub-cacheline information, such as which offsets (e.g., blocks of data) of a payload of the cache line need to be accessed. Rather than fetch the entire payload of the cache line, vector 300 may effectively provide sub-cacheline information, allowing only desired blocks to be fetched, which may help reduce cache misses and increase performance.

Figure 3:
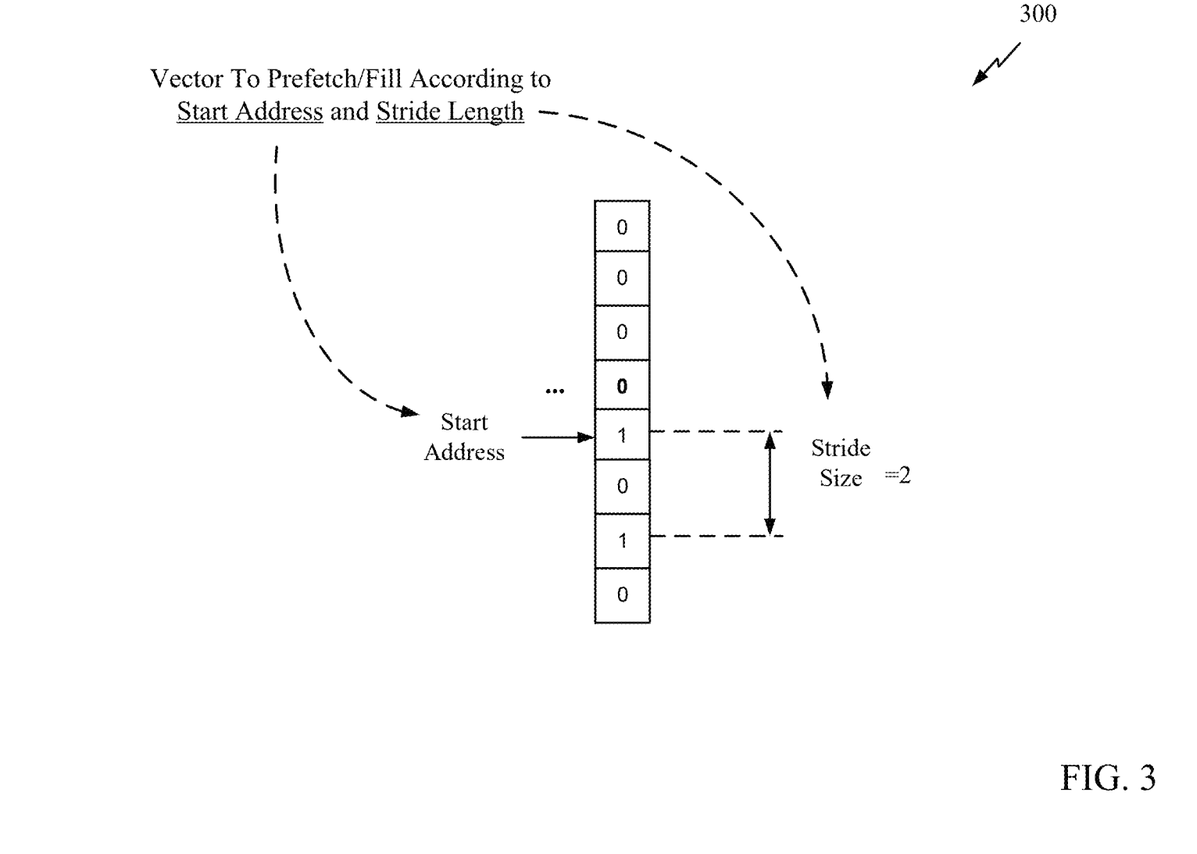
FIG. 3 depicts an example vector structure that may be used for IMP memory accesses, according to various aspects of the present disclosure.

Techniques proposed herein may be used to efficiently generate accurate prefetch address and offsets, and generate a prefetch vector structure, such as prefetch vector 300 of FIG. 3. The techniques may help prevent the launch prefetch-request pipeline from stalling, while calculating a precise offset of the trigger virtual address relative to the beginning of the cacheline.

Figure 4:
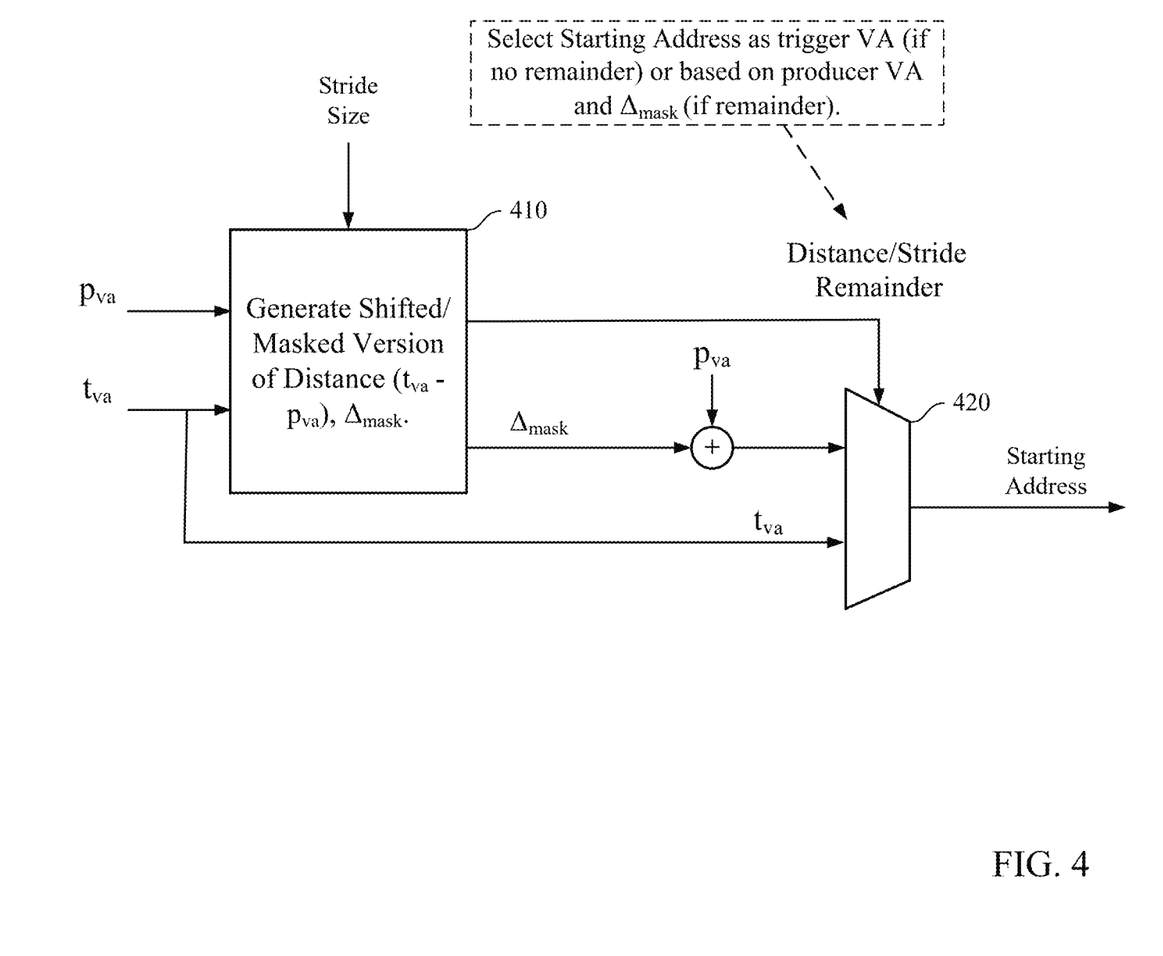
FIG. 4 depicts an example structure for generating a prefetch address, according to various aspects of the present disclosure.

FIG. 4 depicts an example of an efficient structure for generating a starting address for a prefetch, according to various aspects of the present disclosure. The starting address may represent a precise offset of the trigger virtual address relative to the beginning of the cacheline.

The starting address may be generated based on an algorithm as follows. First a distance may be calculated that represents an absolute difference between the trigger virtual address and a producer virtual address:

$$\text{Distance} = \Delta = \text{abs}(t_{va} - p_{va}); \qquad \text{Eq. 0}$$

where $t_{va}$ is the trigger virtual address and $p_{va}$ is the producer virtual address. Next, a number of steps may be calculated as a function of the distance and a stride size:

$$\#\text{steps} = \text{ceil}(\Delta / \text{Stride}); \qquad \text{Eq. 1}$$

where Stride is the stride length/size. The ceiling function is applicable, since only full steps are taken. Substituting Eq. 1 into Eq. 2 (assuming $t_{va} > p_{va}$), yields:

$$\#\text{steps} = \text{ceil}((t_{va} - p_{va})/\text{Stride}), \qquad \text{Eq. 2}$$

$$SA = p_{va} + \#\text{steps} * \text{Stride}. \qquad \text{Eq. 3}$$

It may be noted that, if $t_{va} > p_{va}$, Eq. 3 may be re-written as $SA = p_{va} - \#\text{steps} * \text{Stride}$. To facilitate understanding, the present example assumes $t_{va} > p_{va}$ but those skilled in the art will appreciate the algorithm may be extended to apply to other cases.

Certain observations may help simplify logic used to generate a start address for prefetch, for example, to allow for relatively simple and efficient circuitry using logic 410 and multiplexor 420 of FIG. 4.

A first observation is that the stride is typically with a value of $2^N$. As a result, a real divider (which is relatively complex to implement in hardware) is not actually needed to calculate the #steps per Eq. 1. Rather logical shifts (which are relatively simple to implement in hardware) may be used, as $(\frac{1}{2}^N)$ is the same as $2^{-N}$, and a logical shift right divides the original value by 2.

A second observation relates to properties of the ceiling function that may help simplify logic used to generate a start address, as follows. Given the ceiling function in Eq. 2, #steps will either be:

$$\#\text{steps} = (t_{va} - p_{va})/\text{Stride}; \qquad \text{Eq. 4}$$

if $(t_{va} - p_{va})$ is divisible by $2^N$, meaning no remainder, OR $$\#\text{steps} = (t_{va} - p_{va})/\text{Stride} + 1; \qquad \text{Eq. 5}$$

if $(t_{va} - p_{va})$ is not divisible by $2^N$, meaning there is a remainder for $(t_{va} - p_{va})/\text{Stride}$.

First addressing the case where $(t_{va} - p_{va})$ is divisible by $2^N$, substituting Eq. 4 into Eq. 3, yields:

$$SA = p_{va} + [(t_{va} - p_{va})/\text{Stride}] * \text{Stride} \qquad \text{Eq. 6}$$
$$= p_{va} + (t_{va} - p_{va}) = t_{va}$$

This result means logic may simply select the trigger virtual address as the starting address when $(t_{va} - p_{va})$ is divisible by $2^N$.

Next addressing the case where $(t_{va} - p_{va})$ is not divisible by $2^N$, substituting Eq. 5 into Eq. 3, yields:

$$SA = p_{va} + [(t_{va} - p_{va})/\text{Stride} + 1] * \text{Stride}. \qquad \text{Eq. 7}$$

Which, assuming Stride=2N, may be re-written as:

$$SA = p_{va} + [(t_{va} - p_{va}) >> N + 1] << N; \qquad \text{Eq. 8}$$

where >>N represents a logical shift right by N and <<N represents a logical shift left by N.

Due to the right shift within the brackets, before the left shift, some masking may be used to avoid losing values of certain (e.g., least significant) bits. As a result, $$SA = p_{va} + \Delta_{mask} + (1 << N); \qquad \text{Eq. 9}$$

where $\Delta_{mask}$ is essentially a shifted and masked version of the distance defined in Eq. 0 above. As illustrated, the logic 410 may, thus, be configured to generate this Shifted/Masked Version of Distance $(t_{va}-p_{va})$, $\Delta_{mask}$, based on $t_{va}$, $p_{va}$ and the stride size Stride.

So, taking advantage of these operations, simplified logic may be able to generate a starting address as the trigger virtual address $t_{va}$ itself (per Eq. 6) or using the producer virtual address $p_{va}$ and $\Delta_{mask}$ (per Eq. 9). For example, multiplexor 420 may be configured to select $t_{va}$ if the remainder of $(t_{va}-p_{va})$/Stride is zero OR to select an address based on $p_{va}$ and $\Delta_{mask}$ if the remainder of $(t_{va}-p_{va})$/Stride is non-zero.

Figure 5:
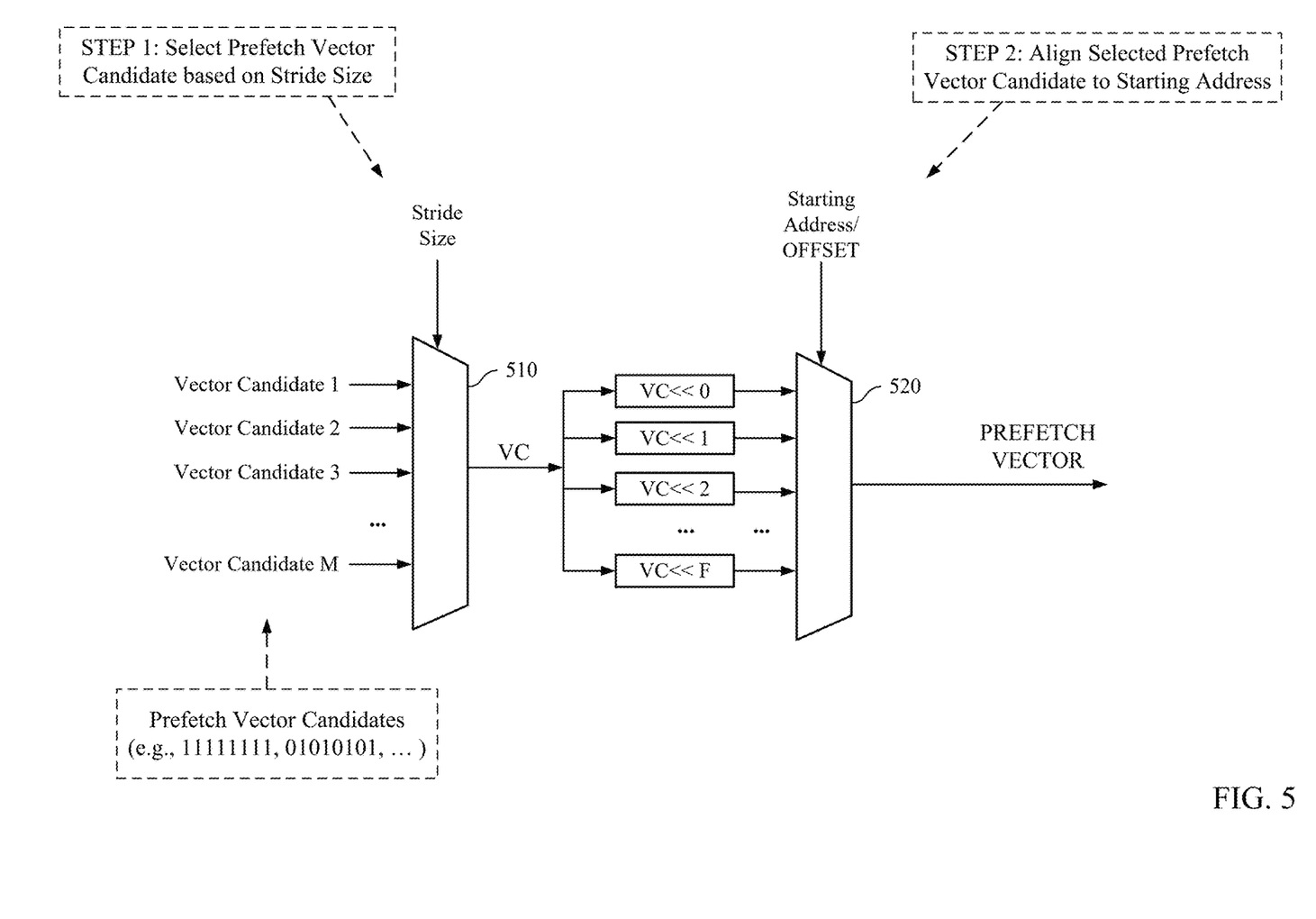
FIG. 5 depicts an example structure for generating a prefetch vector, according to various aspects of the present disclosure.

The starting address (and offset) generated in this manner may be used to generate a prefetch vector (e.g., prefetch vector 300 of FIG. 3). For example, FIG. 5 depicts an example structure for generating a prefetch vector based on a starting address and the stride size, according to various aspects of the present disclosure.

As illustrated, in a first step, a suitable prefetch vector candidate may be selected using a multiplexor 510, based on the stride size. As indicated, the prefetch vector candidates may be defined according to different values of the stride size. For example, for a stride size of 2 (as illustrated in FIG. 3), the vector candidate may be 01010101.

As illustrated, in a second step, the selected vector candidate may be aligned to the starting address may be used to control a multiplexor 520. The multiplexor 520 may be used to select a logically shifted version of the selected prefetch vector candidate to align (the first 1) of the prefect vector candidate to the starting address. For example, referring again to FIG. 3, a prefetch vector candidate corresponding to a stride size of 2 that has been shifted by 4 may be selected (by multiplexor 520) to align with the start address shown in the illustrated example.

Example Method

Figure 6:
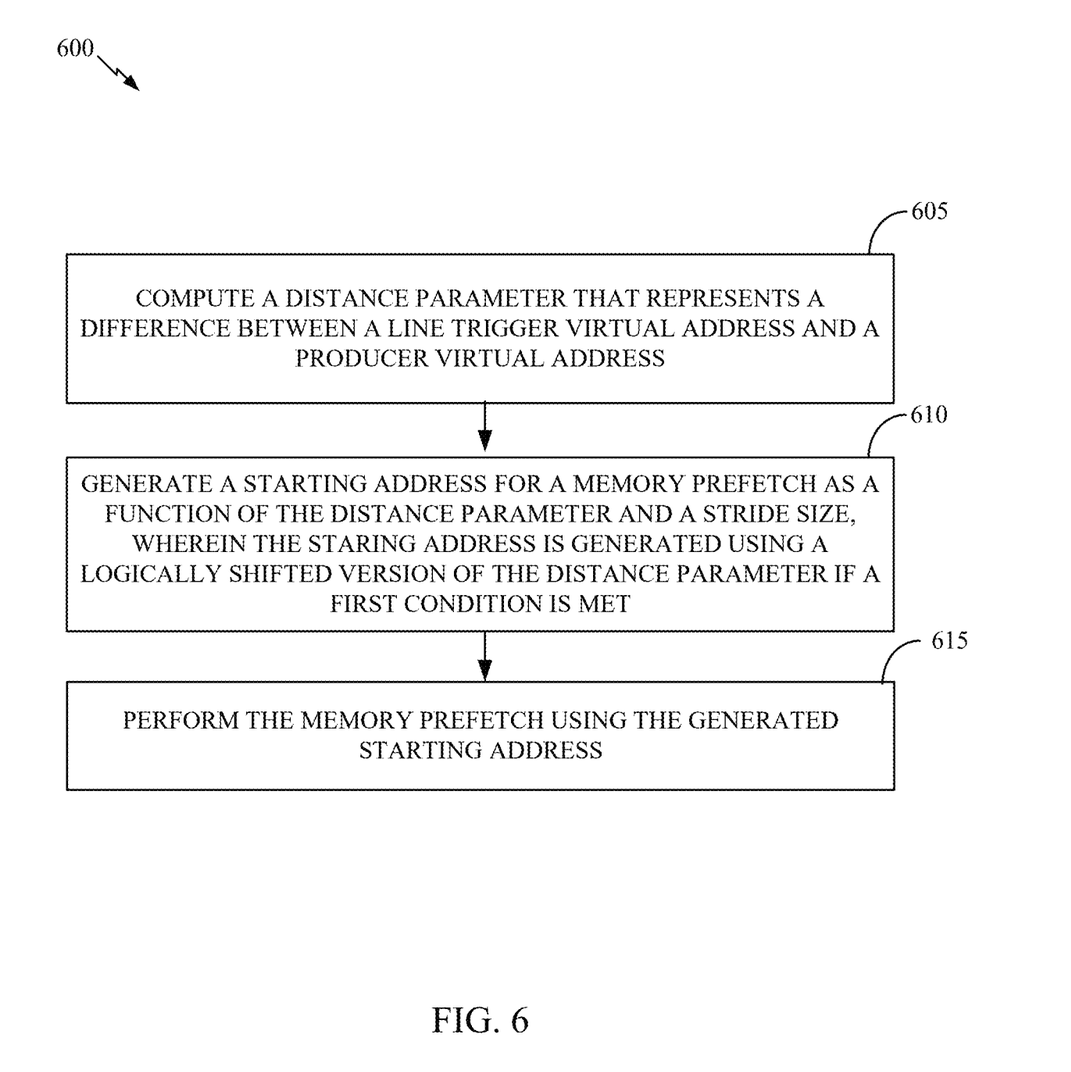
FIG. 6 depicts a method for training an IMP address generation component, according to various aspects of the present disclosure.

FIG. 6 is a diagram depicting an example method 600 for generating a prefetch address, according to various aspects of the present disclosure. For example, method 600 may be performed by the CPU 110 of FIG. 1 and/or by a processing system such as processing system 700 of FIG. 7, described below.

Method 600 begins at block 605, with computing a distance parameter that represents a difference between a line trigger virtual address and a producer virtual address.

Method 600 continues at block 610, with generating a starting address for a memory prefetch as a function of the distance parameter and a stride size, wherein the staring address is generated using a logically shifted version of the distance parameter if a first condition is met.

Method 600 continues at block 615, with performing the memory prefetch using the generated starting address.

Example Processing System

Figure 7:
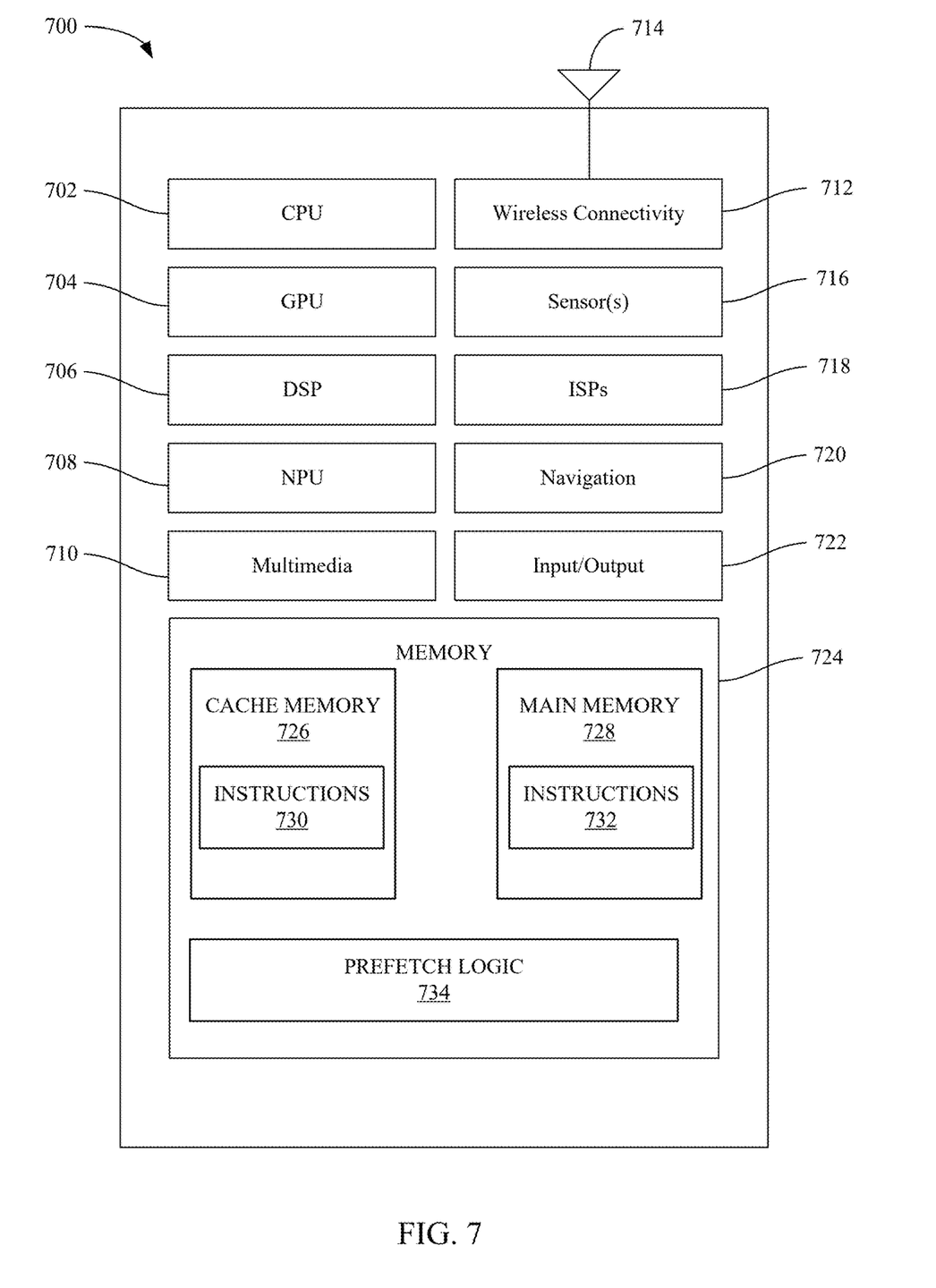
FIG. 7 depicts an example processing system configured to perform various aspects of the present disclosure.

In some aspects, the techniques and methods described with reference to FIGS. 2-6 may be implemented on one or more devices or systems. FIG. 7 depicts an example processing system 700 configured to perform various aspects of the present disclosure, including, for example, the techniques and methods described with respect to FIGS. 2-4. In some aspects, the processing system 700 may correspond to the computing environment 100 of FIG. 1. Although depicted as a single system for conceptual clarity, in some aspects, as discussed above, the operations described below with respect to the processing system 700 may be distributed across any number of devices or systems.

The processing system 700 includes a central processing unit (CPU) 702 (e.g., corresponding to CPU 110 of FIG. 1). Instructions executed at the CPU 702 may be loaded, for example, from a cache memory (e.g., corresponding to the cache memory 120 of FIG. 1) associated with the CPU 702.

The processing system 700 also includes additional processing components tailored to specific functions, such as a graphics processing unit (GPU) 704, a digital signal processor (DSP) 706, a neural processing unit (NPU) 708, a multimedia component 710 (e.g., a multimedia processing unit), and a wireless connectivity component 712.

An NPU, such as NPU 708, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 708, are configured to accelerate the performance of common machine learning tasks, such as image classification, machine translation, object detection, and various other predictive models. In some examples, a plurality of NPUs may be instantiated on a single chip, such as a SoC, while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 708 is a part of one or more of the CPU 702, the GPU 704, and/or the DSP 706.

In some examples, the wireless connectivity component 712 may include subcomponents, for example, for third generation (3G) connectivity, fourth generation (4G) connectivity (e.g., 4G Long-Term Evolution (LTE)), fifth generation connectivity (e.g., 5G or New Radio (NR)), Wi-Fi connectivity, Bluetooth connectivity, and/or other wireless data transmission standards. The wireless connectivity component 712 is further coupled to one or more antennas 714.

The processing system 700 may also include one or more sensor processing units 716 associated with any manner of sensor, one or more image signal processors (ISPs) 718 associated with any manner of image sensor, and/or a navigation processor 720, which may include satellite-based positioning system components (e.g., GPS or GLONASS), as well as inertial positioning system components.

The processing system 700 may also include one or more input and/or output devices 722, such as screens, touch-sensitive surfaces (including touch-sensitive displays), physical buttons, speakers, microphones, and the like.

In some examples, one or more of the processors of the processing system 700 may be based on an ARM or RISC-V instruction set.

The processing system 700 also includes the memory 724, which is representative of one or more static and/or dynamic memories, such as a dynamic random access memory, a flash-based static memory, and the like. In this example, the memory 724 includes computer-executable components, which may be executed by one or more of the aforementioned processors of the processing system 700.

The memory 724 may include cache memory 726 (e.g., corresponding to the cache memory 120 illustrated in FIG. 1). The memory 724 may also include main memory 728 (e.g., corresponding to the main memory 130 illustrated in FIG. 1). The cache memory 726 may include instructions 730 to be executed by the CPU 702. The main memory 728 also includes instructions 732 to be executed by the CPU 702. As discussed previously, a prefetcher (e.g., the prefetcher 114 illustrated in FIG. 1) may anticipate that the CPU 702 needs instructions 732 from the main memory 728 and fetch the instructions 732 from the main memory 728 and load the instructions 732 into the cache memory 726 before the instructions 732 are requested by the CPU 702.

Generally, the processing system 700 and/or components thereof may be configured to perform the methods described herein. For example, the memory 724 may include sub-cacheline filtering logic 734, such as the start address/offset generation logic 220 of FIG. 2, needed to perform the disclosed techniques, such as the method of FIG. 4, to improve the timeliness and/or accuracy of prefetches performed by a prefetcher.

Notably, in other aspects, elements of the processing system 700 may be omitted, such as where the processing system 700 is a server computer or the like. For example, the multimedia component 710, the wireless connectivity component 712, the sensor processing units 716, the ISPs 718, and/or the navigation processor 720 may be omitted in other aspects. Further, aspects of the processing system 700 may be distributed between multiple devices.

Example Clauses

Implementation examples are described in the following numbered clauses:

Clause 1: A method for performing a memory prefetch, comprising computing a distance parameter that represents a difference between a line trigger virtual address and a producer virtual address; generating a starting address for a memory prefetch as a function of the distance parameter and a stride size, wherein the staring address is generated using a logically shifted version of the distance parameter if a first condition is met; and performing the memory prefetch using the generated starting address.

Clause 2: The method of Clause 1, wherein the first condition is considered met if the distance parameter divided by the stride size results in a non-zero remainder.

Clause 3: The method of Clause 2, wherein generating the starting address using the logically shifted version of the distance parameter comprises: generating an offset value using the logically shifted version of the distance parameter comprises; and generating the starting address by adding the offset value to the producer virtual address.

Clause 4: The method of Clause 3, further comprising applying a logical mask to the logically shifted version of the distance parameter when generating the offset value.

Clause 5: The method of Clause 2, wherein the starting address is generated using the line trigger virtual address if the distance parameter is an integer multiple of the stride size.

Clause 6: The method of any one of Clauses 1-5, wherein performing the memory prefetch using the generated starting address comprises generating a prefetch vector.

Clause 7: The method of claim 6, wherein: a starting location of values set in the prefetch vector is based on the generated starting address; and which locations in the prefetch vector are set depends on the stride size.

Clause 8: The method of Clause 7, wherein the prefetch vector is generated using: a first multiplexor to select masking values based on the stride size; and a second multiplexor to logically shift the selected masking values to align with the generated starting address.

Clause 9: An apparatus, comprising: at least one memory comprising executable instructions; and at least one processor configured to execute the executable instructions and cause the apparatus to perform a method in accordance with any combination of Clauses 1-8.

Clause 10: An apparatus, comprising means for performing a method in accordance with any combination of Clauses 1-8.

Clause 11: A non-transitory computer-readable medium comprising executable instructions that, when executed by at least one processor of an apparatus, cause the apparatus to perform a method in accordance with any combination of Clauses 1-8.

Clause 12: A computer program product embodied on a computer-readable storage medium comprising code for performing a method in accordance with any combination of Clauses 1-8.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

For example, means for obtaining a triggering access comprising a line trigger virtual address denoting a beginning of a payload of a cache line may include a prefetcher (e.g., prefetcher/address generation component 200 of an IMP as illustrated in FIG. 2). Means for determining a stride associated with the producer workload based, at least in part, on a virtual address of the producer workload may include the prefetcher. Means for determining a sub-cacheline trigger virtual address of the triggering access based, at least in part, on the line trigger virtual address of the triggering access, the virtual address of the producer workload, and the stride associated with the producer workload may include the prefetcher. Means for launching, starting at the sub-cacheline trigger virtual address of the triggering access, prefetches for data offsets within the cache line and pointed to by the stride associated with the producer workload may include the prefetcher.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for performing a memory prefetch, comprising:
   circuitry configured to compute a distance parameter that represents a difference between a line trigger virtual address and a producer virtual address;
   circuitry configured to generate a starting address for a memory prefetch as a function of the distance parameter and a stride size, wherein the staring address is generated using a logically shifted version of the distance parameter if a first condition is met; and
   circuitry configured to perform the memory prefetch using the generated starting address.

2. The apparatus of claim 1, wherein the first condition is considered met if the distance parameter divided by the stride size results in a non-zero remainder.

3. The apparatus of claim 2, wherein the circuitry configured to generate the starting address using the logically shifted version of the distance parameter comprises:
   circuitry configured to generate an offset value using the logically shifted version of the distance parameter comprises; and
   circuitry configured to generate the starting address by adding the offset value to the producer virtual address.

4. The apparatus of claim 3, further comprising circuitry configured to apply a logical mask to the logically shifted version of the distance parameter when generating the offset value.

5. The apparatus of claim 2, wherein the starting address is generated using the line trigger virtual address if the distance parameter is an integer multiple of the stride size.

6. The apparatus of claim 1, wherein the circuitry configured to perform the memory prefetch using the generated starting address comprises circuitry configured to generate a prefetch vector.

7. The apparatus of claim 6, wherein:
   a starting location of values set in the prefetch vector is based on the generated starting address; and
   which locations in the prefetch vector are set depends on the stride size.

8. The apparatus of claim 7, wherein the prefetch vector is generated using:
   a first multiplexor to select masking values based on the stride size; and
   a second multiplexor to logically shift the selected masking values to align with the generated starting address.

9. A method for performing a memory prefetch, comprising:
   computing a distance parameter that represents a difference between a line trigger virtual address and a producer virtual address;

generating a starting address for a memory prefetch as a function of the distance parameter and a stride size, wherein the staring address is generated using a logically shifted version of the distance parameter if a first condition is met; and performing the memory prefetch using the generated starting address.

10. The method of claim 9, wherein the first condition is considered met if the distance parameter divided by the stride size results in a non-zero remainder.

11. The method of claim 10, wherein generating the starting address using the logically shifted version of the distance parameter comprises:

generating an offset value using the logically shifted version of the distance parameter comprises; and generating the starting address by adding the offset value to the producer virtual address.

12. The method of claim 11, further comprising applying a logical mask to the logically shifted version of the distance parameter when generating the offset value.

13. The method of claim 10, wherein the starting address is generated using the line trigger virtual address if the distance parameter is an integer multiple of the stride size.

14. The method of claim 9, wherein performing the memory prefetch using the generated starting address comprises generating a prefetch vector.

15. The method of claim 14, wherein:

a starting location of values set in the prefetch vector is based on the generated starting address; and which locations in the prefetch vector are set depends on the stride size.

16. The method of claim 15, wherein the prefetch vector is generated using:

a first multiplexor to select masking values based on the stride size; and a second multiplexor to logically shift the selected masking values to align with the generated starting address.

17. An apparatus for performing a memory prefetch, comprising:

means for computing a distance parameter that represents a difference between a line trigger virtual address and a producer virtual address;

means for generating a starting address for a memory prefetch as a function of the distance parameter and a stride size, wherein the staring address is generated using a logically shifted version of the distance parameter if a first condition is met; and means for performing the memory prefetch using the generated starting address.

18. The apparatus of claim 17, wherein the first condition is considered met if the distance parameter divided by the stride size results in a non-zero remainder.

19. The apparatus of claim 18, wherein means for generating the starting address using the logically shifted version of the distance parameter comprises:

means for generating an offset value using the logically shifted version of the distance parameter comprises; and means for generating the starting address by adding the offset value to the producer virtual address.

20. The apparatus of claim 19, further comprising means for applying a logical mask to the logically shifted version of the distance parameter when generating the offset value.

* * * * *